(12) United States Patent
Šmarda et al.

(10) Patent No.: US 11,646,955 B2
(45) Date of Patent: May 9, 2023

(54) SYSTEM AND METHOD FOR PROVIDING CONSISTENT VALUES IN A FAULTY NETWORK ENVIRONMENT

(71) Applicant: Avast Software s.r.o., Prague (CZ)

(72) Inventors: Martin Šmarda, Karlovy Vary (CZ); Pavel Šrámek, Příbram (CZ); Vojtěch Tůma, Brtnice (CZ)

(73) Assignee: Avast Software s.r.o., Prague (CZ)

( * ) Notice: Subject to any disclaimer, the term of this patent is extended or adjusted under 35 U.S.C. 154(b) by 0 days.

(21) Appl. No.: 15/930,034

(22) Filed: May 12, 2020

(65) Prior Publication Data

US 2020/0366586 A1    Nov. 19, 2020

Related U.S. Application Data

(60) Provisional application No. 62/848,489, filed on May 15, 2019.

(51) Int. Cl.

| | |
|---|---|
| G06F 15/173 | (2006.01) |
| H04L 43/0817 | (2022.01) |
| H04W 24/02 | (2009.01) |
| H04L 43/06 | (2022.01) |
| G06F 11/34 | (2006.01) |
| H04L 43/04 | (2022.01) |
| G06F 11/00 | (2006.01) |

(52) U.S. Cl.
CPC ........ *H04L 43/0817* (2013.01); *G06F 11/008* (2013.01); *G06F 11/3476* (2013.01); *H04L 43/04* (2013.01); *H04L 43/06* (2013.01); *H04W 24/02* (2013.01)

(58) Field of Classification Search
CPC ............................. H04L 43/04; H04L 43/0817
USPC .......................................................... 709/224
See application file for complete search history.

(56) References Cited

U.S. PATENT DOCUMENTS

| | | |
|---|---|---|
| 5,774,640 A | 6/1998 | Kurio |
| 7,519,488 B2 | 4/2009 | Fu et al. |
| 2003/0210734 A1 | 11/2003 | Kaku |
| 2004/0168100 A1 | 8/2004 | Thottan et al. |
| 2006/0268685 A1 | 11/2006 | Bender et al. |
| 2008/0052384 A1* | 2/2008 | Marl ................... H04L 41/0273 709/223 |
| 2010/0281539 A1 | 11/2010 | Burns et al. |
| 2010/0305990 A1* | 12/2010 | Tyree ..................... G06Q 10/06 709/224 |
| 2010/0332906 A1* | 12/2010 | Agrawal ............. H04L 41/0806 709/224 |

(Continued)

*Primary Examiner* — Hee Soo Kim
(74) *Attorney, Agent, or Firm* — Avek IP, LLC; William B. Kircher

(57) ABSTRACT

A system persistently presents consistent properties of devices on a local network based on observed values for the network devices, and values derived from the observed values. The observed values may be received from an agent based on scans of the local network. Even though some scans may be faulty resulting in missing or incorrect data, a user can be consistently presented with properties of the device, even when the missing or incorrect data would otherwise cause a change to the property. For instance, the system may replace a data value that is either missing or determined to be incorrect with a value that is determined, based on historical or lab observations, to be the likely correct value based on the assumed state or likely state of the observed device.

20 Claims, 6 Drawing Sheets

(56) References Cited

U.S. PATENT DOCUMENTS

| | | | |
|---|---|---|---|
| 2020/0050538 A1* | 2/2020 | Schmalz, Jr. | G06F 11/3006 |
| 2020/0351178 A1* | 11/2020 | Guha | H04L 47/781 |

* cited by examiner

SYSTEM AND METHOD FOR PROVIDING CONSISTENT VALUES IN A FAULTY NETWORK ENVIRONMENT

CROSS-REFERENCE TO RELATED APPLICATIONS

This application claims priority to U.S. Provisional Patent Application Ser. No. 62/848,489, filed on May 15, 2019, entitled "RELIABLE OBSERVATIONS IN A FAULTY ENVIRONMENT,", the entire disclosure of which is incorporated herein by reference.

FIELD

The disclosure relates generally to computer systems, and more particularly to making reliable observations in the presence of potentially faulty networks and systems.

BACKGROUND

It is common to have a set of agents deployed in independent computing network environments, where the agents record observations that can be used to attempt to derive insights about software or other aspects of the computing environments. As one particular example, software on customer's computer may scan the network, attempting to detect security weaknesses and security vulnerabilities of other devices or assess security status of the network as a whole. In many cases, the observations can be difficult to conduct reliably, because of the faultiness of environments. For example, network instability, individual device misbehavior, communication failure, presence of noise, or user re-configuration can contribute to faultiness in a computer network environment.

Thus, a technical problem with making observations in a faulty environment such as a network environment is that it can be difficult to maintain a sound record of observed history in the presence of faultiness. That is, it can be difficult to detect when absence of data means faulty observation and provide an extrapolation of the data and eliminate the noise in the data.

BRIEF DESCRIPTION OF THE DRAWINGS

For a better understanding of the inventive subject matter, reference may be made to the accompanying drawings in which.

DETAILED DESCRIPTION

Figure 1:
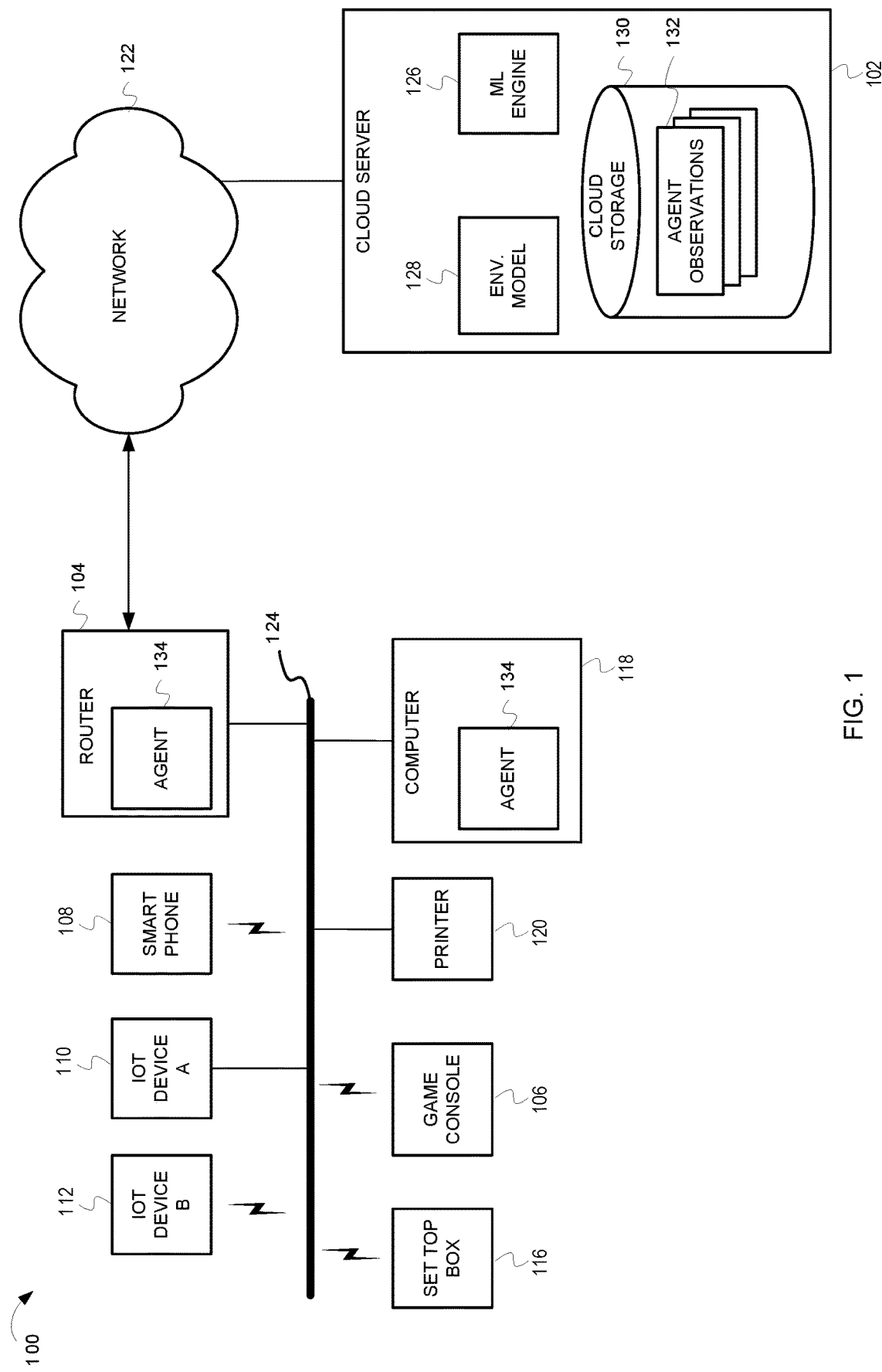
FIG. 1 is a block diagram illustrating an example system for making reliable observations in faulty environments according to embodiments.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a block diagram illustrating an example system 100 for making reliable observations in faulty environments. In some embodiments, system 100 can include a cloud server 102 communicably coupled to a local network 124 via a network 122. Local network 124 can be a wired network, a wireless network, or a combination of the two. In some embodiments, local network 124 can be a home network. In alternative embodiments, local network 124 can be a network in a small business or a corporate network. Network 122 can be any collection of one or more wired networks, wireless networks, or combinations of the two that cover a greater domain than local network 124. In some aspects, network 122 can be one or more networks that make up the Internet.

Many different types of devices may be communicably coupled to network 124. In the example illustrated in FIG. 1, local network 124 includes a router 104, game console 106, IOT devices 110, 112, smart phone 108, set top box 116, computer 118, and printer 120. An IOT device (e.g., IOT devices 110, 112) can be any type of device that can includes a processor and a network interface to communicate data via local network 124 and/or network 122. Examples of such devices include, but are not limited to smart televisions, smart home appliances, cameras, sensors, biochips, office devices, implantable medical devices, and vehicle-based devices.

Computer 118 can be a server computer, a laptop computer, a tablet computer, or any other device having a processor and memory enabling the device to execute programs.

Smart phones 108 and 116 can be any type of smart phone. Examples of smart phones include Android based smart phones, iPhones, and Windows phones. The embodiments are not limited to any particular type of smart phone. Smart phone 108 may be the same type of phone as smart phone 116, or it may be a different type.

Router 104 forwards network data between local network 124 and network 122. Router 104 can be a standalone router, a wireless router or access point, a modem/router or any other device that forwards data between two networks.

In some aspects, a computer 118 can include an agent 134. Agent 134 can be a standalone application, or it can be part of another application or application suite. For example, agent 134 can be part of an antivirus or other antimalware software suite executing on a computer 118 or any of the devices on network 124 (e.g., devices 106-120). Further, the agent 134 can execute on router 104. Each agent 134 can have a unique ID (e.g., a GUID). In some aspects, an agent 134 can periodically scan the network 124 and gather observations about devices on network 124, with a goal of approximating the actual state of a device, group of devices or the network itself. As one example, the agent 134 can do a port scan of a device to determine open ports on the device. The agent 134 can then send probe requests to selected open ports. As but one example, the agent 134 can issue HyperText Transfer Protocol (HTTP) requests to selected devices of interest to gather observations about the devices or network. Many other types of requests, for example over Simple Service Discover Protocol (SSDP), Multicast Domain Name System (mDNS), Server Message Block (SMB) or telnet protocols, are possible and within the scope of the inventive subject matter.

Agent 134 can actively and/or passively monitor the network 124. In active monitoring, the agent 134 can send requests to a device and receive a response. In passive monitoring (also referred to as snooping or sniffing), agent 134 monitors packets on network 124 that have been transmitted by devices on the network. Agent 134 can provide the data obtained from the active and/or passive monitoring (i.e., observations) to cloud server 102.

Cloud server 102 can receive the observation data from agent 134. In some aspects, the data from agent 134 can be received in real-time. In alternative embodiments, data may be received periodically and not necessarily in real-time. In some embodiments, cloud server 102 can include cloud storage 130, a machine learning engine 126, and an environment model 128. Cloud storage 130 can allocate or dedicate space for each agent ID to store agent observations 132 received or derived from data received from a particular agent 134. Cloud server 102 can provide this data to a machine learning engine 126 which can receive the data and use the data as further described below.

Environment model 128 can be a cloud server 102 resident procedure that is configured to correct, if necessary, the agent observations 132 received from an agent 134. In some aspects, environment model 128 comprises one or more statistically derived procedures to correct agent observations 132. For example, if observations have determined that a port "XXX" (where "XXX" represents a port number) is open in ninety percent of the observations, then the environment model 128 can be set to treat the port "XXX" as open all of the time. The ten percent of observations in which the port "XXX" is indicated as closed can be disregarded as being a glitch caused by the inherent unreliability of making observations in a network environment in which network faults may occasionally occur. In further aspects, environment model 128 can include rules that can be applied to the data and used to correct observation data. The statistically derived procedures and rules can determine confidence levels for the corrected observation. In some aspects, the rules in environment model 128 can be rules that represent domain expert knowledge encoded within the set of rules.

Agent 134 can provide data that can be used to detect or determine various observations and/or states. Examples of such observations and states include, but are not limited to:

1. For every device on the local network, detect a list of open ports on the device; and for particular ports, attempt to extract corresponding data (e.g., HTML data from an HTTP port). The particular ports from which attempts are made to extract data can include ports in one or more lists, tables, or other data structures maintained and provided by the cloud server 102. Such ports may be placed on the list or table based on research and/or analysis of data gathered over time by agents 134. Additionally, there can be more than one table stored in the monitoring agent 134. In some embodiments, there can be code inside an agent 134 which decides which set of port tables to use while scanning ports. The agent 134 can decide on a port to scan based on the particular circumstances, for example, using data and observations an agent 134 has available. For example, an agent 134 may take the manufacturer of an observed device into account when determining ports to scan.

Note that extracted data can lead to more data extraction options (e.g., via the Simple Service Discovery Protocol). As a non-limiting example, an observing agent 134 can utilize a 'data-driven' approach to determine its future steps using data currently available. Any new piece of data may enable observing agent to explore other options of obtaining more data. For example, if a port scanning discovers opened port 5000, a HTTP GET request can be sent to the port. If the service at port 5000 responds and the response contains HTTP headers specific to Universal Plug and Play (UPnP) protocol, then agent 134 can attempt to send another probe to acquire an eXtensible Markup Language (XML) file containing UPnP descriptor from the service.

2. For every device, attempt to discover security weaknesses and security vulnerabilities (e.g., weak or no passwords, a particular vulnerability present etc.) by executing security probes. These are executed based on the results of step 1 above.

3. For every device, attempt to identify what device class (e.g., Mobile Phone, Router, etc.) and what device model (e.g., Galaxy S6) the device is, again, based on the results of step 1 above.

It should be noted that although only one local network 124 is illustrated in FIG. 1, cloud server 102 can receive data from many different local networks 124. Additionally, there can be more than one cloud server 102 within a system. The data received from the many different local networks 124 can be used to train the machine learning engine 126. Once trained, models produced by the machine learning engine can then be used as further described blow to provide corrected observations and confidence levels.

The number and types of devices illustrated in FIG. 1 is to be considered as an example. Those of skill in the art having the benefit of the disclosure will appreciate that a network 124 can include more or fewer devices and device types than that illustrated in FIG. 1.

Figure 2:
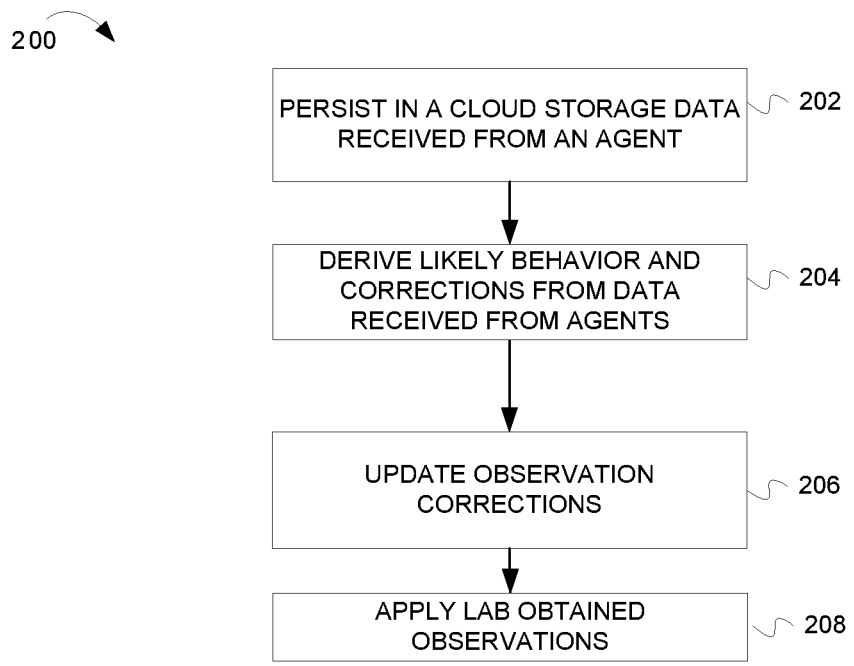
FIG. 2 is a flow chart illustrating operations of a method for making reliable observations in faulty environments according to embodiments.

FIG. 2 is a flow chart illustrating operations of a method for making reliable observations in faulty environments according to embodiments.

At block 202, a cloud server 102 can persist in a cloud storage data received from the agent. For example, the cloud server 102 can store a history of an agent's observations. Further, cloud server can store an approximation of the state of the agent's network environment (that is, an approximation of an ideal observation), for both the agent and other components to use.

At block 204, likely behavior in terms of effects of faultiness, is derived using statistical measures of the observation types and environment types. In some aspects, the "likely behavior" can be deemed to be what is most likely to be the true status, based on past observations. For example, if the system statistically derives that port "X" (where "X" represents a port number) is likely to be open but not reported as such in certain cases, the likely behavior can be "in case of a particular observation pattern of port X being sometimes open, sometimes closed, treat the port as open all the time". The likely behavior can then be applied to observations as necessary (e.g., due to faultiness) to correct the observations. Examples of such fault corrections can include filling missing data, removing extraneous data and deriving higher-level features from the observations.

On the agent-side of a network 124, the likely behavior can be used to contrast the currently ongoing observation to the approximation of the state of the environment so that the agent's next steps can be decided quickly. For example, if the agent queries an HTTP service on port 80 and the connection breaks, the agent may expect, based on its previous experience with this particular device and network, that a correct reply is likely and expectable, and may immediately decide to retry the HTTP query on the grounds of suspecting a spurious fault taking place.

On the cloud-side, the most recent observations can be merged into the approximation of the state of the environment, using full history of observations. A limited version of this process exists can also on the agent-side, to allow for fast decisions when the connection to the cloud server 102 is unstable.

At block 206. The ML engine 126 can update and improve the observation corrections. For example, ML engine 126 can processes all observation data from all agents, grouping them by their similarities, taking both the original observations and the applied corrections into account.

In some aspects, any software component that derives further insights from the observed data is given access to corrected observations only. However, in other aspects, a software component can be provided access to uncorrected observations. This can be desirable as it can allow for another level of cross-verification of the correctional procedures.

The statistical measures can be used in various ways. In some aspects, a time-based decaying mechanism is used to distinguish a true absence from a missing observation, fine-tuned by measured gaps in observed presences of particular observation type. For example, if a service on port 8888 is repeatedly seen open, and querying it yields the same useful data 80 percent of the time, the classification derived from the data may be applied even at times when the query was unsuccessful once or twice (i.e., a missing observation), but no longer be considered when data is not received 10 times in a row (i.e., a true absence, something about the device had changed). Further, correlation between distinct types of observations is considered, as they often have the same underlying cause that can't be observed directly. Also, individual agent histories are investigated for anomalous and/or unexpected behavior, to eliminate random noise. For example, if in most local networks 124, devices could be expected to offer useful data on ports 80 and 8080 should said ports be open, and the system may then find that with 30 percent likelihood devices with these ports open are video recording units and thus offer a prediction when seeing an observation with said ports open even before data is extracted from them, then when an agent having a history of seeing devices with these ports open while being unable to acquire data from them queries a new device and finds these ports open, the system may decide not to apply the 30 percent likely prediction as this particular agent has a history of anomalous measurements. Real changes of the agents (e.g., purposeful action of the user) can also be accounted for. In some aspects, statistical analysis of behavior of a port over time can be used to distinguish purposeful action from anomalous or unexpected behavior. For instance, when an observation is potentially faulty, typically a "flapping-like" behavior is seen and is typically seen across multiple ports. For example, a flapping behavior can be determined if a port is closed once every 5 minutes but open rest of the time. This can be distinguished from purposeful behavior. For example, when a user changes something, the user typically makes the change once and does not change their mind every five minutes. This distinction is one example of how purposeful action can be distinguished from anomalous or unexpected behavior. Other examples are possible and within the scope of the inventive subject matter. It should be understood that the constants and processes described in conjunction with the above examples are exemplary in nature, and are not fixed, predetermined values. In operation, the constants and processes in will be derived from data and heuristic analysis.

In some aspects, a decision is assigned a statistical confidence value, allowing for simple discarding of low-confidence decisions in the presence of newer data conflicting with them.

At block 208, the statistically derived corrections can be accompanied by laboratory environment where simulations take place, to derive correction methods heuristically, and to fine-tune statistical corrections or discard them when they fail to generalize.

For example, determining a corrected observation of a state of a case-specific problem can benefit from the application of extraneous data to facilitate better corrections than those determined based on observations the agent actually reports, given a limited bandwidth. For example, extraneous data from observations obtained within a laboratory environment allows for highly parallel testing of variants and statistical evaluation of their usefulness.

As will be appreciated from the above, the above-described system can persistently present consistent properties of devices on their local network based on observed and derived values received from the network devices. Even though some scans may be faulty resulting in missing or incorrect data, the user can be consistently presented with properties of the device, even when the missing or incorrect data would otherwise cause a change to the property. In other words, the system can persistently provide a consistent value for a device property even when missing or incorrect data would result in a different value for the device property being presented. For instance, the system may replace a data value that is either missing or determined to be incorrect with a value that is determined, based on historical or lab observations, to be the likely correct value based on the assumed state or likely state of the observed device. Thus, as an example, the system can persistently provide consistent values for device properties such as device class (e.g., Mobile Phone, Router, etc.) and device model (e.g., Galaxy S6) of their network devices.

Figure 3:
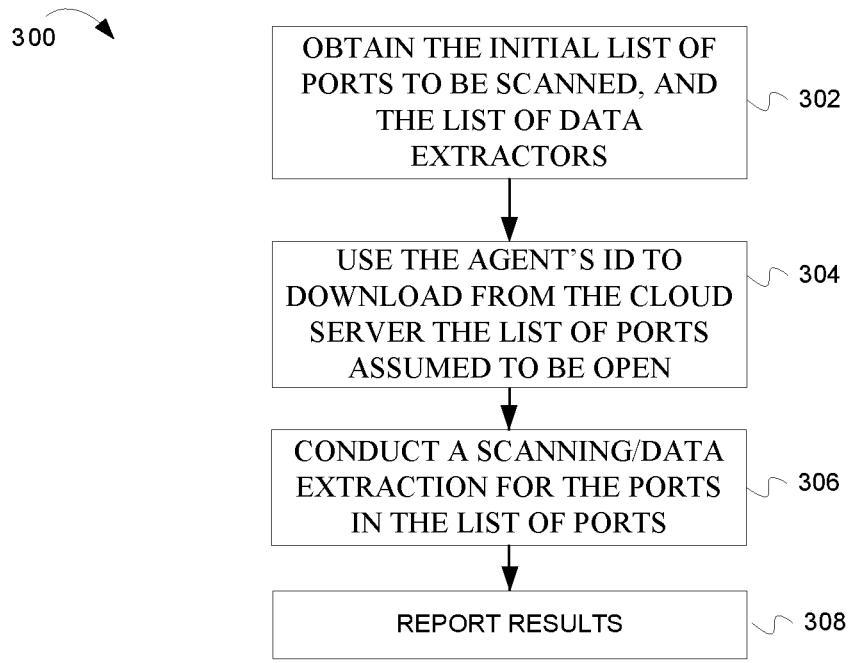
FIG. 3 is a flow chart illustrating agent-based operations of a method for making reliable observations in faulty environments according to embodiments.

FIG. 2 has described aspects for making reliable observations in faulty environments in a general context applicable to many different environments. FIG. 3-X will provide further details of the method in the context of a security software environment.

FIG. 3 is a flow chart illustrating agent-based operations of a method for making reliable observations in faulty environments according to embodiments.

At block 302, the agent obtains the initial list of ports to be scanned, and the list of data extractors, along with the instructions on how and in which order to execute them. These lists can be downloaded from the cloud server or can be provided as part of the agent software.

At block 304, the agent can use the agent's ID to download from the cloud server the list of ports assumed to be open.

At block 306, the agent can conduct a scanning/data extraction for the ports in the list of ports. This scanning/data extraction can be performed for every device detected on the network, using the ports determined at block 302 and 304 to conduct a scanning/data extraction of the ports.

At block 308, the agent reports results of the scanning/data extraction to the cloud server.

Figure 4:
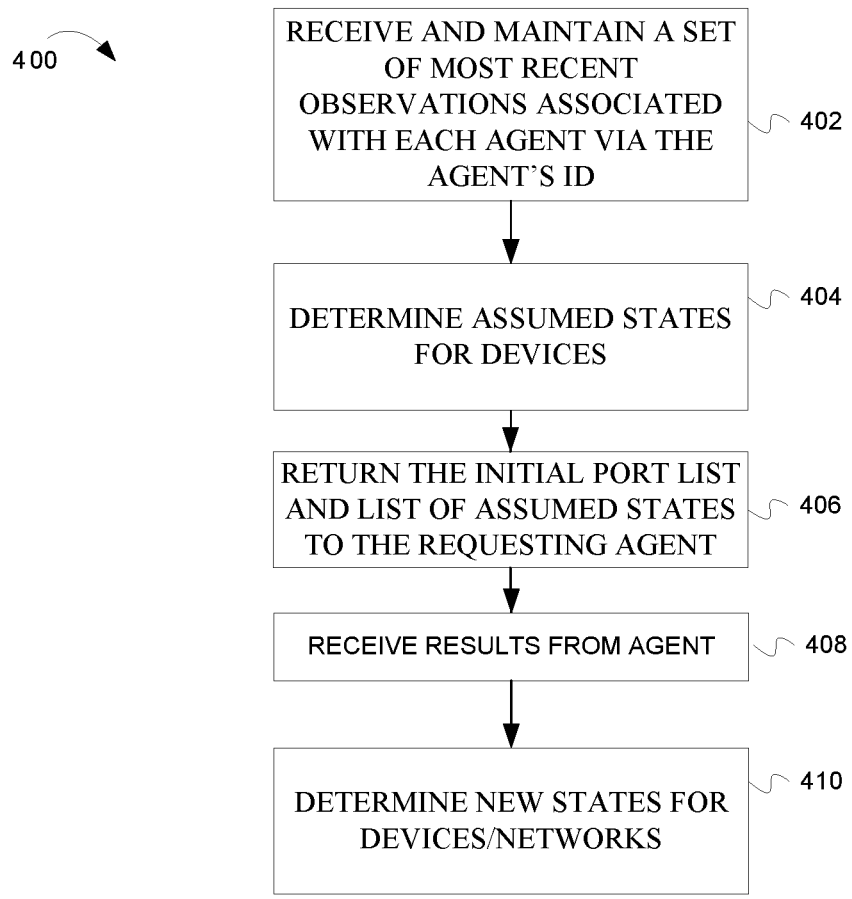
FIG. 4 is a flow chart illustrating cloud server-based operations of a method for making reliable observations in a faulty environment according to embodiments.

FIG. 4 is a flow chart illustrating cloud server-based operations of a method for making reliable observations in a faulty environment according to embodiments.

At block 402, a cloud server maintains a set of most recent observations associated with each agent via the agent's ID. In some aspects, an observation can be of the form (timestamp, device MAC/IP, port number, protocol, failure or extracted data). As one example, an observation may be the result of querying a UPnP service on port 1900, acquiring a response and extracting from the acquired response. The failure or extracted data can depend on a response received from a UPnP request. In the case of a successful request, the response data will be the full UPnP textual response, which can be the extracted data for the observation. In the case of a request failure, the response may be a partial response (e.g., the end of the response is missing), a response indicating a failure (e.g., "Access denied"), or no response data at all. The failure indication and/or partial data received in the response can be the failure or extracted data.

In addition to maintaining recent observations, the cloud server can maintain a list of ports to be scanned and corresponding extractors, manually configured by a domain expert.

At block 404, the cloud server determines assumed states for devices. An assumed state can have the form (device MAC/IP, port number, protocol, present data). The present data can be in an XML format or other format that can be parsed. An example of present data may be as follows:

```
<?xml version="1.0"?>
<rootxmlns="urn:schemas-upnp-org:device-1-0">
<URLBase>base URL for all relative URLs </URLBase>
<device>
<friendlyName>short user-friendly title </friendlyName>
<manufacturer>manufacturer name</manufacturer>
<manufacturerURL>URL to manufacturer site</manufacturerURL>
. . .
```

The present data can refer to any data present in a device's response, whether the request is successful or not. For example, the present data in the case of an HTTP request failure can be "404 Not Found."

At block 406, upon receiving a request from an agent, the cloud server returns the initial port list and list of assumed states to the requesting agent.

At block 408, upon receiving a result report from an agent, the cloud server can append the reported observation data to the list of observations. In some aspects, reported observation data can be raw report from the agent. In further aspects, the reported observation data can include corrections to the raw report data. In still further aspects, the reported observation data can be the assumed state.

At block 410, the cloud server can determine a new assumed state, using the environment model.

Figure 5:
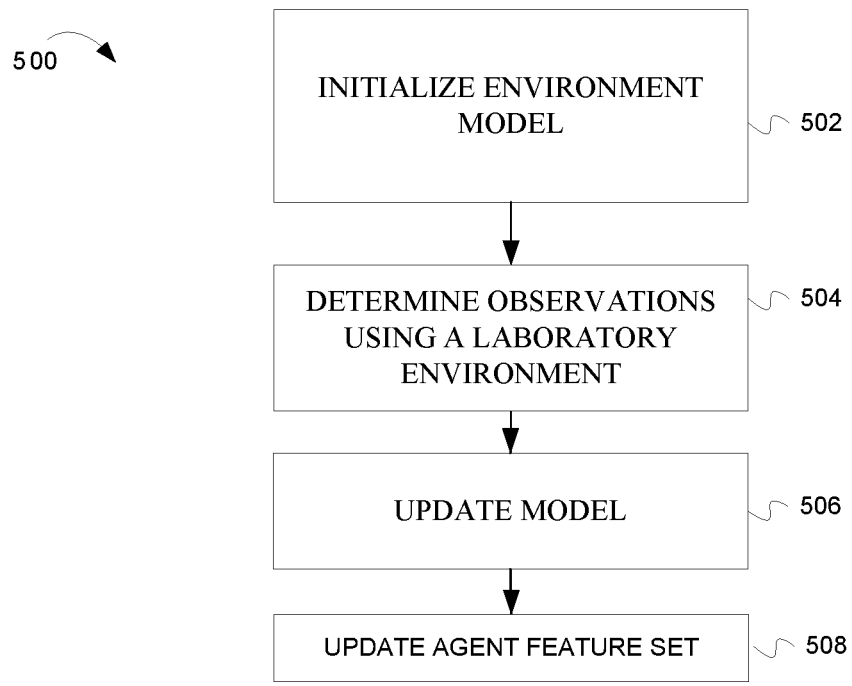
FIG. 5 is a flow chart illustrating example cloud server-based operations for creating and maintaining an environment model according to embodiments.

FIG. 5 is a flow chart illustrating example cloud server-based operations for creating and maintaining an environment model according to embodiments.

At block 502, the cloud server can initialize the environment model by taking the most recent observation to be the assumed state.

At block 504, the cloud server can determine observations using a laboratory environment (where perfect information about the actual state is available). For example, a set of experiments can be conducted in the laboratory environment and the cloud server can derive a simple time-series-based model per port/protocol—that is, for a sequence of (timestamp, observationResult, actualState), derive a model that predicts actualState from (timestamp, observationResult). The cloud server can update the environment model based on the results of the set of experiments.

At block 506, the cloud server can update the model. In some aspects, the cloud server can process all recent observations by the agents, and determine anomalies in the recent observations. In some embodiments, the updates to the model can be performed in a batch mode by the cloud server. In some embodiments, the anomalies can include one or more of the following:

a. Unreported occurrence—if a port has been observed as open for some time range, later observed as not open (and the assumed State was also not open) or not allowing for data extraction, and finally again as open.

b. Causal occurrence—if a port has not been observed as open but a service discovery says it should have been, or some port has been observed as open, yet it was not discovered via service discovery. Indirect evidence may be used to determine that a port should have been open. For example, data broadcasts, service discovery data not requested by the agent, or other data can be analyzed to determine if there is data indicating that a port should be open.

c. Noise presence—if a port has been observed as open exactly once in a time range, possibly with unexpectedly formatted data extracted.

Those of skill in the art having the benefit of the disclosure will appreciate that other anomalies can be detected and used to update the model. As noted above, in some aspects, detection criteria may be determined based on observations made under laboratory conditions. Further, anomaly detection can be dependent on the timing of observations and reporting. For example, detecting noise presence may be appropriate if the reporting frequency is sufficiently high (e.g., once an hour rather than once a day) and there have been a sufficient number of observations made over time.

For the above cases, the cloud server can assume the actualState (i.e., open for Unreported and Causal occurrence, closed for Noise Presence) and can update the environment model as if the observations were obtained via an experiment performed in a laboratory environment. However, the cloud server can apply higher thresholds on statistical significance, and taking into account other features such as the agent configuration, type of connection, model of the router in the agent's network (if known), etc. The cloud server can also set requirements based on a reliability of a configuration, type of connection, model of router etc. For example, a configuration's reliability can depend on whether the configuration was established in a lab setting, whether the configuration was established based on a large user base having the configuration and behaving in a stable way (for example, not having many anomalies), or other reliability considerations.

At block 508, the cloud server can optionally update an agent's feature set in situations where the previous approaches fail to give conclusive results (i.e., seemingly same input leads to different outcomes). The source of the feature set update can include the following types of sources:

a. External information—this consists of properties of the network such as connection type, connection speed, ping loss; static properties of the devices—vendor (such as detected from the OUI corresponding to the MAC address), device type (predicted from extracted data); domain-specific knowledge (a particular port is known to be often reconfigured); etc. Extending this feature set amounts to first experimenting with it in the laboratory environment and then distributing it via regular software update mechanism; re-running Model training in either case once sufficient volume of data has been collected.

b. Internal information—this amounts to configuration of the agent itself, such as delays between scanning individual ports on the same device or overall, number of retries for a given port; or to its on-line decision process, how to conduct service discovery, how to proceed with data extraction, scanning ports at random, etc. A large user base can be used to exploit and distribute different configurations per cohort, re-running Model training as in previous case.

Variations

In some aspects, heuristical corrections and fine tunings can be manually applied.

In some aspects, the agent's behavior can be modified in the case of unstable cloud connection.

The above described systems and methods can be applied to a variety of different environments. Such environments include deployments of software components (not restricted to PCs) to both small- and large-scale network environments, that either passively listen to network traffic or actively probe other connected devices. Desirable characteristics of the environments can include one or more of the following:

a. a large scale of deployed agents that share many traits of finite dimension, so that statistical approach can be used, b. the observations are understood in temporal context, so that the decaying mechanism applies, c. observations are faulty, for example, due to a faulty environment or natural environment evolution, d. particular situations can be simulated in a laboratory environment, so that measures may be fine-tuned, and heuristics can be derived.

In addition to the above-described aspects and advantage, the above-described systems and method can be applied in the on-line settings. The behavior of the agents is driven by the observations they are making, the observations can be corrected quickly and in real-time or near real-time.

Figure 6:
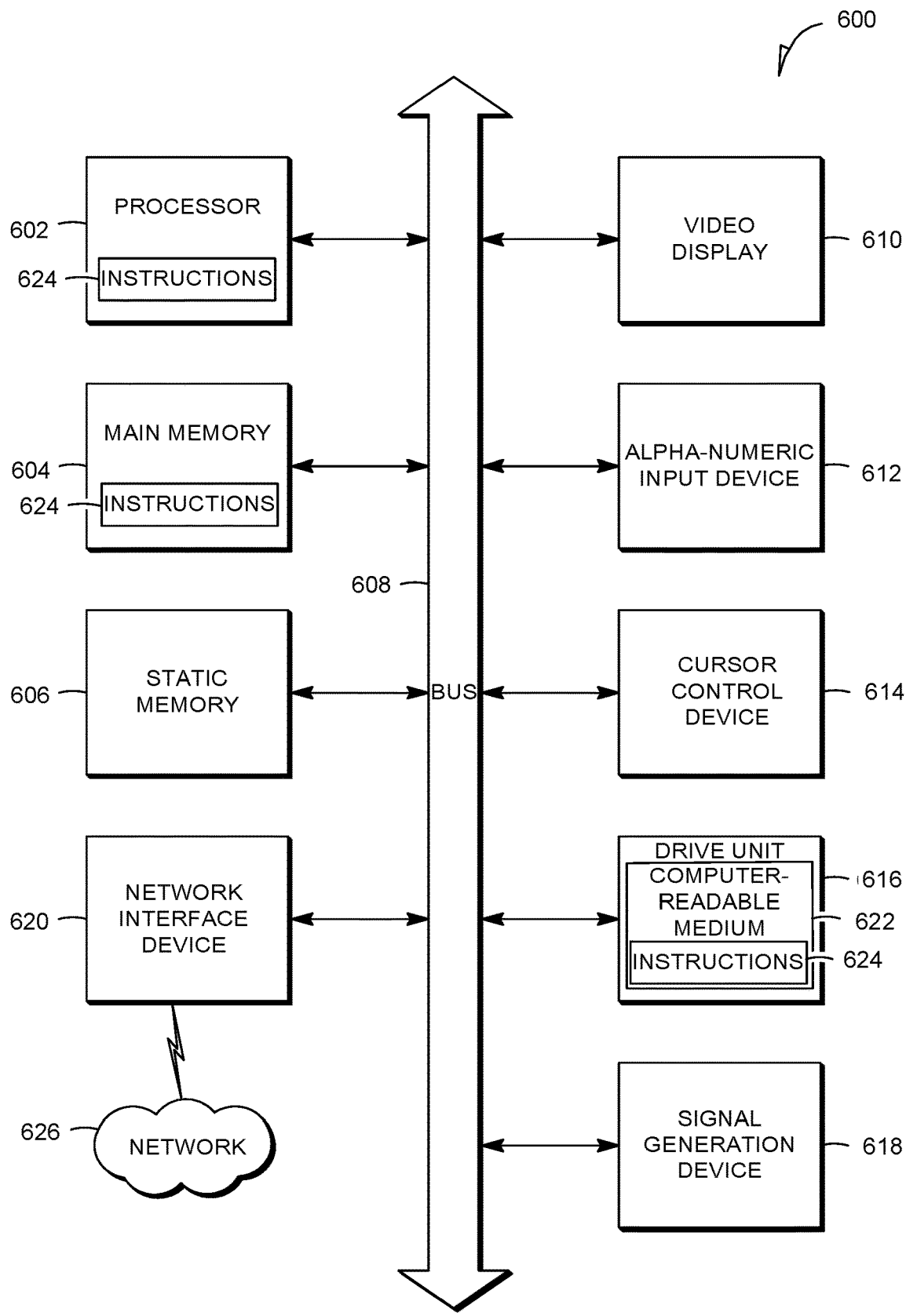
FIG. 6 is a block diagram of an example embodiment of a computer system upon which embodiments of the inventive subject matter can execute.

FIG. 6 is a block diagram of an example embodiment of a computer system 600 upon which embodiments of the inventive subject matter can execute. The description of FIG. 6 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 6 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 6, an example embodiment extends to a machine in the example form of a computer system 600 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 600 may include a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). In example embodiments, the computer system 600 also includes one or more of an alpha-numeric input device 612 (e.g., a keyboard), a user interface (UI) navigation device or cursor control device 614 (e.g., a mouse), a disk drive unit 616, a signal generation device 618 (e.g., a speaker), and a network interface device 620.

The disk drive unit 616 includes a machine-readable medium 622 on which is stored one or more sets of instructions 624 and data structures (e.g., software instructions) embodying or used by any one or more of the methodologies or functions described herein. The instructions 624 may also reside, completely or at least partially, within the main memory 604 or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 624 may further be transmitted or received over a communications network 626 using a signal transmission medium via the network interface device 620 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for providing consistent values for network properties by making reliable observations in a faulty environment, the method comprising:
    receiving a first set of observation data corresponding to components in the faulty environment, wherein the faulty environment comprises a local network;
    determining a first set of assumed states for the one or more components based, at least in part, on the first set of observation data;
    receiving a second set of observation data from an agent in the faulty environment, the second set of observation data obtained via a scan of the one or more components by the agent in the faulty environment;
    determining if the second set of observation data includes one or more anomalous data values;
    wherein the first set of observation data and the second set of observation data include one or more of: a class, a vendor, and a model of a device;
    in response to determining that the second set of observation data includes an anomalous data value, determining, based at least in part on the assumed states for the one or more components, a replacement value for the anomalous data value, and replacing the anomalous data value with the replacement value in an updated set of observation data, such that network operation is improved; and
    providing the replacement value in place of the anomalous data value for presentation as a device property value to a user via a user interface, wherein the replacement value comprises a value consistent with a previously presented value determined, based at least in part, on the first set of observation data such that the device property value is persistently and consistently presented to the user over a plurality of observations provided by the agent.

2. The method of claim 1, further comprising:
    in response to determining that at least one expected data value is missing from the second set of observation data, determining, based at least in part on the assumed states for the one or more components, an insertion value corresponding to the expected data value; and inserting the insertion value into an updated set of observation data.

3. The method of claim 2, further comprising providing the insertion for presentation as a device property value to a user via a user interface, wherein the insertion value comprises a value consistent with a previously presented device property value determined, based at least in part, on the first set of observation data such that the device property value is persistently and consistently presented to the user over a plurality of observations provided by the agent.

4. The method of claim 2, wherein determining that the at least one expected data value is missing from the second set of observation data is based, at least in part, on a time-based decay of previously observed data values.

5. The method of claim 1, wherein receiving the first set of observation data comprises receiving the first set of observation data from the agent in the faulty environment.

6. The method of claim 1, wherein receiving the first set of observation data comprises receiving the first set of observation data from a second agent in a laboratory environment.

7. The method of claim 1, wherein determining if the second set of observation data includes one or more anomalous data values comprises determining at least one of an unreported occurrence in the second set of observation data or a causal occurrence in the second set of observation data.

8. The method of claim 1, wherein determining if the second set of observation data includes one or more anomalous data values comprises determining that a port has been observed as open exactly once in a predetermined or configurable time range.

9. The method of claim 1, further comprising providing a port list to the agent.

10. A system for providing consistent values for network properties by making reliable observations in a faulty environment, the system comprising:
one or more processors; and
a non-transitory machine-readable storage medium having stored thereon instructions, that when executed, cause the one or more processors to:
receive a first set of observation data corresponding to components in a faulty environment, wherein the faulty environment comprises a local area network and wherein an agent is configured to provide the first set of observation data;
determine a first set of assumed states for the one or more components based, at least in part, on the first set of observation data;
receive a second set of observation data from an agent in the faulty environment, the second set of observation data obtained via a scan of the one or more components by the agent;
determine if the second set of observation data includes one or more anomalous data values;
wherein the first set of observation data and the second set of observation data include one or more of: a class, a vendor, and a model of a device;
in response to a determination that the second set of observation data includes an anomalous data value, determining, based at least in part on the assumed states for the one or more components, a replacement value for the anomalous data value; and, and replace the anomalous data value with the replacement value in an updated set of observation data, such that network operation is improved; and
provide the replacement value in place of the anomalous data value for presentation as a device property value to a user via a user interface, wherein the replacement value comprises a value consistent with a previously presented value determined, based at least in part, on the first set of observation data such that the device property value is persistently and consistently presented to the user over a plurality of observations provided by the agent.

11. The system of claim 10, wherein the instructions further comprise instructions to cause the one or more processors to:
in response to a determination that at least one expected data value is missing from the second set of observation data,
determine, based at least in part on the assumed states for the one or more components, an insertion value corresponding to the expected data value, and
insert the insertion value into an updated set of observation data.

12. The system of claim 11, wherein the instructions further comprise instructions to cause the one or more processors to provide the insertion for presentation as a device property value to a user via a user interface, wherein the insertion value comprises a value consistent with a previously presented device property value determined, based at least in part, on the first set of observation data such that the device property value is persistently and consistently presented to the user over a plurality of observations provided by the agent.

13. The system of claim 10, further comprising a second agent in a laboratory environment, the second agent configured to provide the first set of observation data.

14. The system of claim 10, wherein the instructions to determine if the second set of observation data includes one or more anomalous data values comprise instructions to determine at least one of an unreported occurrence in the second set of observation data or a causal occurrence in the second set of observation data.

15. The system of claim 10, wherein the instructions to determine if the second set of observation data includes one or more anomalous data values comprise instructions to determine that a port has been observed as open exactly once in a predetermined or configurable time range.

16. A non-transitory machine-readable storage medium having stored thereon instructions for providing consistent values for network properties by making reliable observations in a faulty environment, that when executed, cause one or more processors to:
receive a first set of observation data corresponding to components in a faulty environment;
determine a first set of assumed states for the one or more components based, at least in part, on the first set of observation data;
receive a second set of observation data from an agent in the faulty environment, the second set of observation data obtained via a scan of the one or more components by the agent;
determine if the second set of observation data includes one or more anomalous data values;
wherein the first set of observation data and the second set of observation data include one or more of: a class, a vendor, and a model of a device;
in response to a determination that the second set of observation data includes an anomalous data value, determining, based at least in part on the assumed states for the one or more components, a replacement value for the anomalous data value;

replace the anomalous data value with the replacement value in an updated set of observation data, such that network operation is improved; and provide the replacement value in place of the anomalous data value for presentation as a device property value to a user via a user interface, wherein the replacement value comprises a value consistent with a previously presented value determined, based at least in part, on the first set of observation data such that the device property value is persistently and consistently presented to the user over a plurality of observations provided by the agent.

17. The non-transitory machine-readable storage medium of claim 16, wherein the instructions further comprise instructions to cause the one or more processors to:

in response to a determination that at least one expected data value is missing from the second set of observation data, determine, based at least in part on the assumed states for the one or more components, an insertion value corresponding to the expected data value, and insert the insertion value into an updated set of observation data.

18. The non-transitory machine-readable storage medium of claim 17, wherein the instructions further comprise instructions to cause the one or more processors to provide the insertion for presentation as a device property value to a user via a user interface, wherein the insertion value comprises a value consistent with a previously presented device property value determined, based at least in part, on the first set of observation data such that the device property value is persistently and consistently presented to the user over a plurality of observations provided by the agent.

19. The non-transitory machine-readable storage medium of claim 16, wherein the instructions to determine if the second set of observation data includes one or more anomalous data values comprise instructions to determine at least one of an unreported occurrence in the second set of observation data or a causal occurrence in the second set of observation data.

20. The non-transitory machine-readable storage medium of claim 16, wherein the instructions to determine if the second set of observation data includes one or more anomalous data values comprise instructions to determine that a port has been observed as open exactly once in a predetermined or configurable time range.

* * * * *